Figure 1:
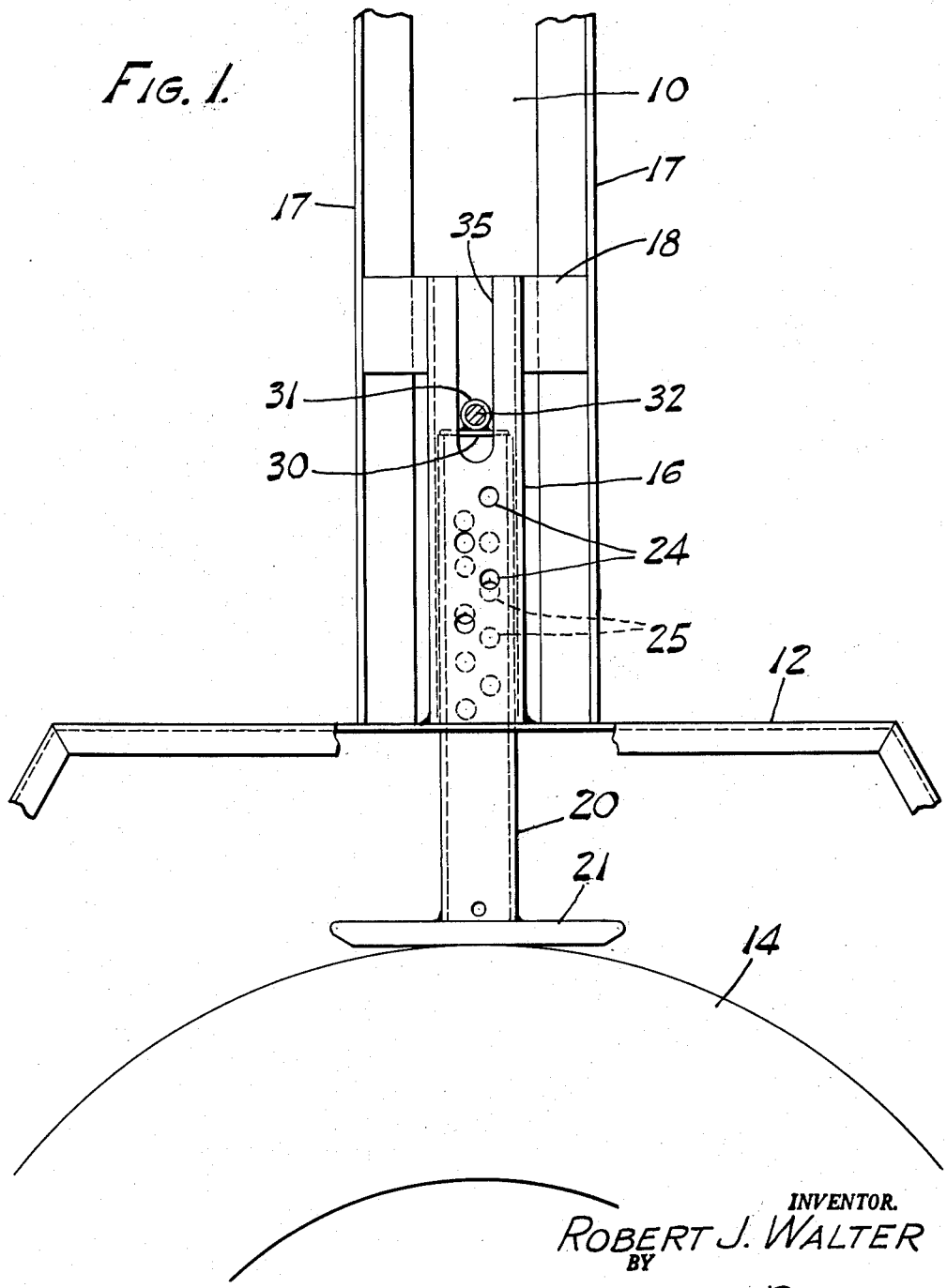

Oct. 8, 1963   R. J. WALTER   3,106,410
TILT PREVENTING STRUCTURE FOR SIDE LOADED VEHICLES
Filed Sept. 15, 1961   2 Sheets-Sheet 1

INVENTOR.
ROBERT J. WALTER
BY
Christel & Bean
ATTORNEYS

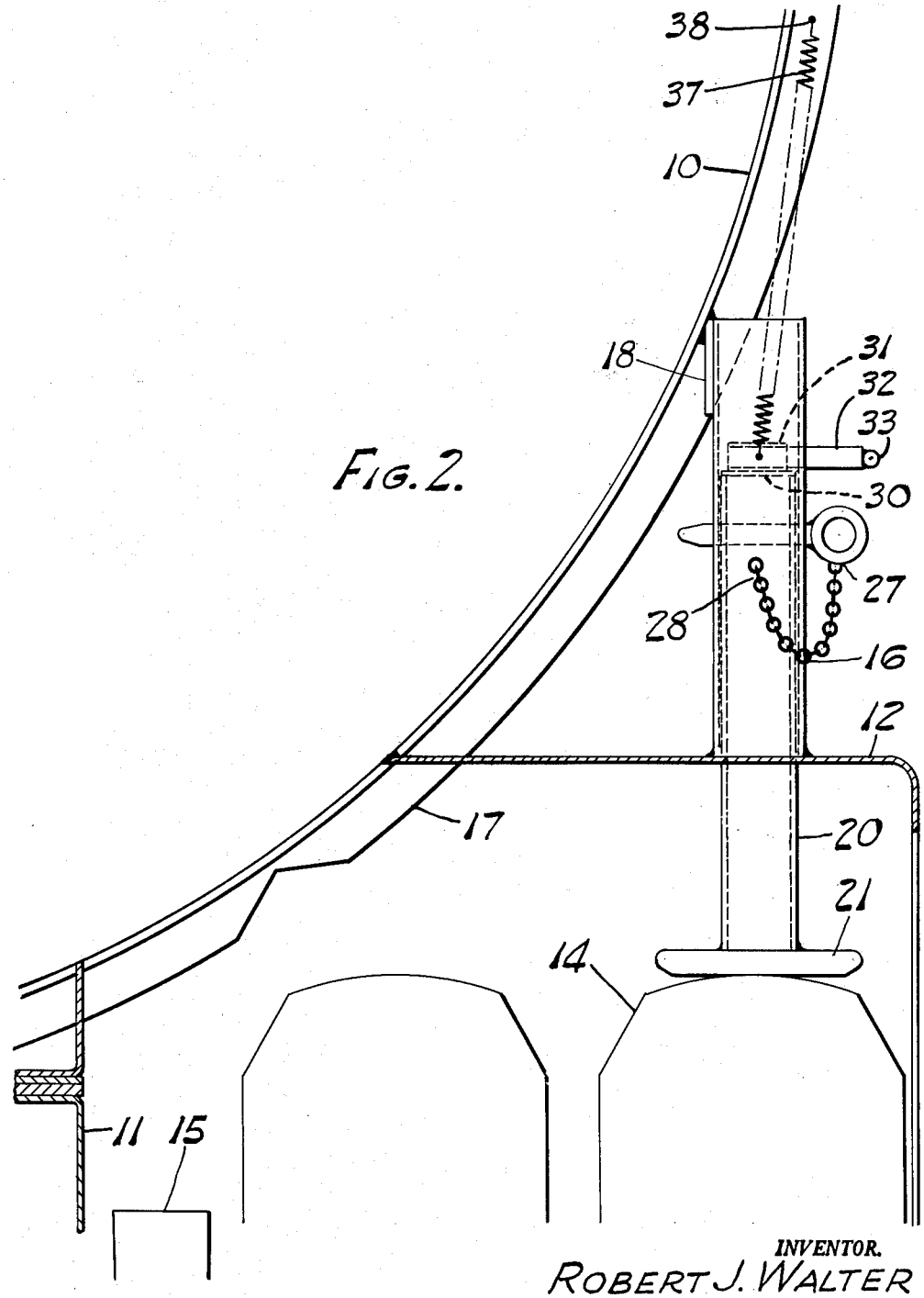

United States Patent Office 3,106,410
Patented Oct. 8, 1963

3,106,410
TILT PREVENTING STRUCTURE FOR SIDE LOADED VEHICLES
Robert J. Walter, Kenmore, N.Y., assignor to Truck Equipment Co., Inc., Buffalo, N.Y.
Filed Sept. 15, 1961, Ser. No. 138,494
5 Claims. (Cl. 280—150)

This invention relates to material transporting automotive vehicles and particularly to means for preventing tilting of such vehicles during side loading operations.

The vehicles with which the present novel tilt-preventing structure is combined are those commonly employed in refuse collection and more particularly vehicles of this class which include means at the side of the vehicle for raising a material container from a position alongside the vehicle for emptying the same into the vehicle body. A vehicle of this general type is disclosed in my copending application Serial No. 124,121 filed July 14, 1961.

In such side loading vehicles very considerable lateral tipping forces are developed, particularly when the container being raised by the side loading mechanism is of unusual weight. The spring suspensions at the loading side depress to a point where stability is threatened and, more commonly, to a point which interferes with the normal smooth operation of the side loading mechanism.

Stated in its broadest terms the present invention embraces a vehicular body, a road wheel structure, a spring suspension intervening between the body and the road wheel structure for resiliently mounting the body on the wheel structure and means for selectively engaging directly between the body and wheel structure in the vicinity of side loading to deactivate the spring suspension and render the body and wheel structure a rigid, unitary, non-resilient framework.

The direct engagement means of the foregoing combination comprises a generally upright tubular guide and housing member attached rigidly to the body structure of vehicle and disposed so that its axis is directed downwardly toward the top portion of the tire of one of the aforesaid road wheels.

A strut member is guided for longitudinal movement in said upright housing member and has a foot portion at its lower end for selective engagement against the top of the aforesaid road wheel, means being provided for quickly selectively locking the strut member in various vertical positions of adjustment relative to the support or housing member so that the spring suspension of the vehicle may be readily immobilized and deactivated whenever temporary side loading operations of such magnitude as to induce undue lateral tipping forces are encountered.

In a preferred form of the present invention means are provided for counterbalancing the weight of the strut member to facilitate positioning and retraction thereof and preferably such means biases the strut member to a raised position. Novel adjustment means are provided to locate and lock the strut member rigidly and securely in various positions of vertical adjustment speedily and with a minimum of effort.

In normal side loading operations of trash or relatively light materials the anti-tilt arrangement may not ordinarily be required. However, when an operator recognizes that a particular container which is to be raised is excessively heavy, or when a raising operation is begun and excessive tilting of the vehicle body evidences itself, the anti-tilt strut member of the present invention is brought down to a position of engagement or approximate engagement with the top of the tire of a wheel which is relatively close to the point where the side loading takes place and locked in position to substantially immobilize or deactivate the spring suspension of such wheel.

Since the vehicle may be loaded to various degrees when the anti-tilt device is to be employed and the spring suspensions are accordingly under varying degrees of deflection, the aforesaid strut member is arranged so that it may quickly be brought down to various positions of vertical adjustment to substantially meet the tire surface and then conveniently locked in such lowered position.

Various objects and advantages inherent in the structure and principles of the present invention will be apparent to those skilled in the present art from a consideration of the accompanying drawings and the following detailed specification. A single embodiment of the principles of the present invention is illustrated in the drawings and described in the specification but it is to be understood that such embodiment is by way of example only and that various modifications may be made therein without departing from the spirit of the invention, the scope of which is limited only as defined in the appended claims.

In the drawings:

FIG. 1 is a fragmentary side elevational view of the portion of a refuse vehicle structure in the vicinity of a rear wheel thereof showing one form of the tilt-preventing arrangement of the present invention; and FIG. 2 is a fragmentary front elevational view of the structure of FIG. 1, partly in cross section.

In the drawing, like characters of reference denote like parts and the numeral 10 designates a longitudinally extending cylindrical refuse receiving body mounted on a motor vehicle chassis or frame indicated at 11 in FIG. 2. Body 10 may be mounted directly on the frame of the automotive vehicle proper or may comprise a portion of a trailer or semi-trailer structure.

A fender member 12 is fixed rigidly with respect to body 10 and in the illustrated instance is associated with a rear wheel 14 of the vehicle, the wheel being equipped with a pneumatic tire in the usual manner. Conventional spring suspensions, most commonly of the leaf spring type, mount the frame 11 on the wheel structure, as indicated somewhat schematically at 15 in FIG. 2.

As indicated earlier herein the anti-tilt arrangement of the present invention is provided primarily for use in combination with side loading mechanism of the type shown and described in my above identified copending application and it is to be understood that such mechanism or its mechanical equivalent may be associated with the side of the body 10 at the right hand side of FIG. 2. For simplicity of illustration and understanding such mechanism is not repeated in the present application but it is to be understood that the side loading mechanism disclosure of my aforesaid copending application is to be considered as incorporated herein by reference.

An upright tubular housing member 16, in the present instance of square cross section, is welded at its lower end to fender 12, the latter having an opening therein registering with the interior of the housing member. A pair of encircling angle iron rings 17 form a part of the reinforcing structure of body 10 and the upper end of housing member 16 is welded or otherwise securely fixed to body 10 as by means of a bracket indicated at 18 in FIG. 2 which is welded to the rings 17 of the body. Thus the cylindrical body 10, the fender 12 and the housing 16 form a rigid triangular truss structure.

A vertically adjustable strut member 20, likewise of square cross section, is slidable within housing 16 and has fixed to its lower end a foot or base plate 21. In a preferred construction housing 16 is in vertical alignment with the axis of wheel 14 as viewed from the side of the vehicle whereby strut member 20 may be lowered so that its foot 21 engages the top of the pneumatic tire of wheel 14, as illustrated in full lines in the drawings.

The square cross sections of the housing 16 and strut member 20 serve to retain the latter against rotation in the housing member and the outer walls of the two members are provided with vertically spaced perforations which are employed in selectively locking the strut member in various desired positions of vertical adjustment. In the illustrated instance the housing and strut member are provided with spaced perforations which are arranged in such manner as to provide relatively small increments of adjustment with a minimum number of perforations and with the perforations arranged and spaced in such a way as to afford maximum strength in the perforated walls of the housing and strut members.

In the specific arrangement illustrated in FIG. 1 a series of four vertically spaced staggered perforations designated 24 is provided in the outer housing member 16. A similarly staggered series of ten vertically spaced perforations in the strut member 20 is designated 25. In the position shown the top perforation 25 of the strut member 20 is in registry with the top perforation 24 of the housing member.

The perforations 24 and 25 extend through both the outer and inner walls of the housing member and strut member and a pin 27 shown in FIG. 2 is manually inserted through various pairs of perforations which may be brought into registry manually as described below. A chain 28 may be provided to connect pin 27 to housing 16 to avoid loss or misplacement of the pin.

As shown in the drawings the upper end of strut member 20 is closed by a plate 30 and a tube 31 is welded to plate 30. A handle pin 32 is secured in tube 31 and is provided with a handle member 33 at its outer end as shown in FIG. 2. Handle pin 32 is adapted to slide vertically in a slot 35 in the upper portion of the outer face of housing 16. An extension coil spring 37 is attached at its lower end to the tube 31 at the top end of strut member 20 and at its upper end to body 10 as at 38. Spring 37 counterbalances the weight of strut member 20 and biases the same toward a raised position wherein it is out of the range of contact with wheel 14.

In the sense in which it is used in the following claims the term "body" refers to the entire spring-supported structure, not only the material receiving portion. Specifically the supporting framework for the material receiving portion of the body, which framework is directly mounted on the springs and is rigidly attached to the body per se, is to be considered as a part of the body as that term is used in the claims.

I claim:

1. In combination with an automotive road vehicle having a material receiving body, road wheels for supporting the same, and spring suspension means between said wheels and said body, a fender fixed rigidly with respect to said body and extending over one of said road wheels, a portion of said body extending at least partly over said fender, a tubular support member fixed at its upper and lower ends to said body and said fender respectively, a strut member slidable in said tubular support and having a foot member at its lower end adapted to move downwardly through said fender into engagement with the upper surface of said road wheel, a plurality of openings in said tubular support and said strut member, and a pin adapted to be inserted through openings in said support and said strut member to hold the latter in various positions of vertical adjustment.

2. In combination with an automotive road vehicle having a material receiving body, road wheels for supporting the same, and spring suspension means between said wheels and said body, a fender fixed rigidly with respect to said body and extending over one of said road wheels, a portion of said body extending at least partly over said fender, a tubular support member fixed at its upper and lower ends to said body and said fender respectively, a strut member slidable in said tubular support and having a foot member at its lower end adapted to be moved downwardly into engagement with the upper surface of said road wheel, a plurality of openings in said tubular support and said strut member, a pin adapted to be inserted through openings in said support and said strut member to hold the latter in various positions of vertical adjustment, and spring means engaging between said strut member and a fixed portion of said vehicle body for urging said strut member toward an upper position.

3. In combination with an automotive road vehicle having a material receiving body, road wheels for supporting the same, and spring suspension means between said wheels and said body, a fender fixed rigidly with respect to said body and extending over one of said road wheels, a portion of said body extending at least partly over said fender, a tubular support member fixed at its upper and lower ends to said body and said fender respectively to form a rigid truss, a strut member slidable in said tubular support and having a foot member at its lower end adapted to be moved downwardly into engagement with the upper surface of said road wheel, and detachable locking means engageable between said support and said strut member to hold the latter in various positions of vertical adjustment.

4. In combination with an automotive road vehicle having a material receiving body, road wheels for supporting the same, and spring suspension means between said wheels and said body, a fender fixed rigidly with respect to said body and extending over one of said road wheels, a portion of said body extending at least partly over said fender, a tubular support member fixed at its upper and lower ends to said body and said fender respectively to form a rigid truss, a strut member slidable in said tubular support and having a foot member at its lower end adapted to be moved downwardly into engagement with the upper surface of said road wheel, detachable locking means engageable between said support and said strut member to hold the latter in various positions of vertical adjustment, and spring means engaging between said strut member and a fixed portion of said vehicle body for urging said strut member toward an upper position.

5. In combination with an automotive road vehicle having a material receiving body, road wheels for supporting the same, and spring suspension means between said wheels and said body, a fender fixed rigidly with respect to said body and extending over one of said road wheels, a portion of said body extending at least partly over said fender, a tubular support member fixed at its upper and lower ends to said body and said fender respectively, a strut member slidable in said tubular support and having a foot member at its lower end adapted to be moved downwardly into engagement with the upper surface of said road wheel, a plurality of openings in said tubular support and said strut member, and a pin adapted to be inserted through openings in said support and said strut member to hold the latter in various positions of vertical adjustment, the openings in said tubular support being spaced differently from the openings in said strut member to provide smaller increments of adjustment than the spacing of said openings.

References Cited in the file of this patent

UNITED STATES PATENTS

| | | |
|---|---|---|
| 1,767,470 | Mitchell | June 24, 1930 |
| 2,741,373 | Edgar | Apr. 10, 1956 |
| 2,797,826 | Kuhlenschmidt et al. | July 2, 1957 |
| 2,934,373 | Doty | Apr. 26, 1960 |
| 3,008,593 | Valleroy | Nov. 14, 1961 |